3,150,627
COLLAPSIBLE FISH BARGE
Raymond M. Stewart, 925 Good Hope St., and Borti P. Petrich, 1337 20th St., both of San Pedro, Calif.
Filed Feb. 11, 1963, Ser. No. 257,684
1 Claim. (Cl. 114—74)

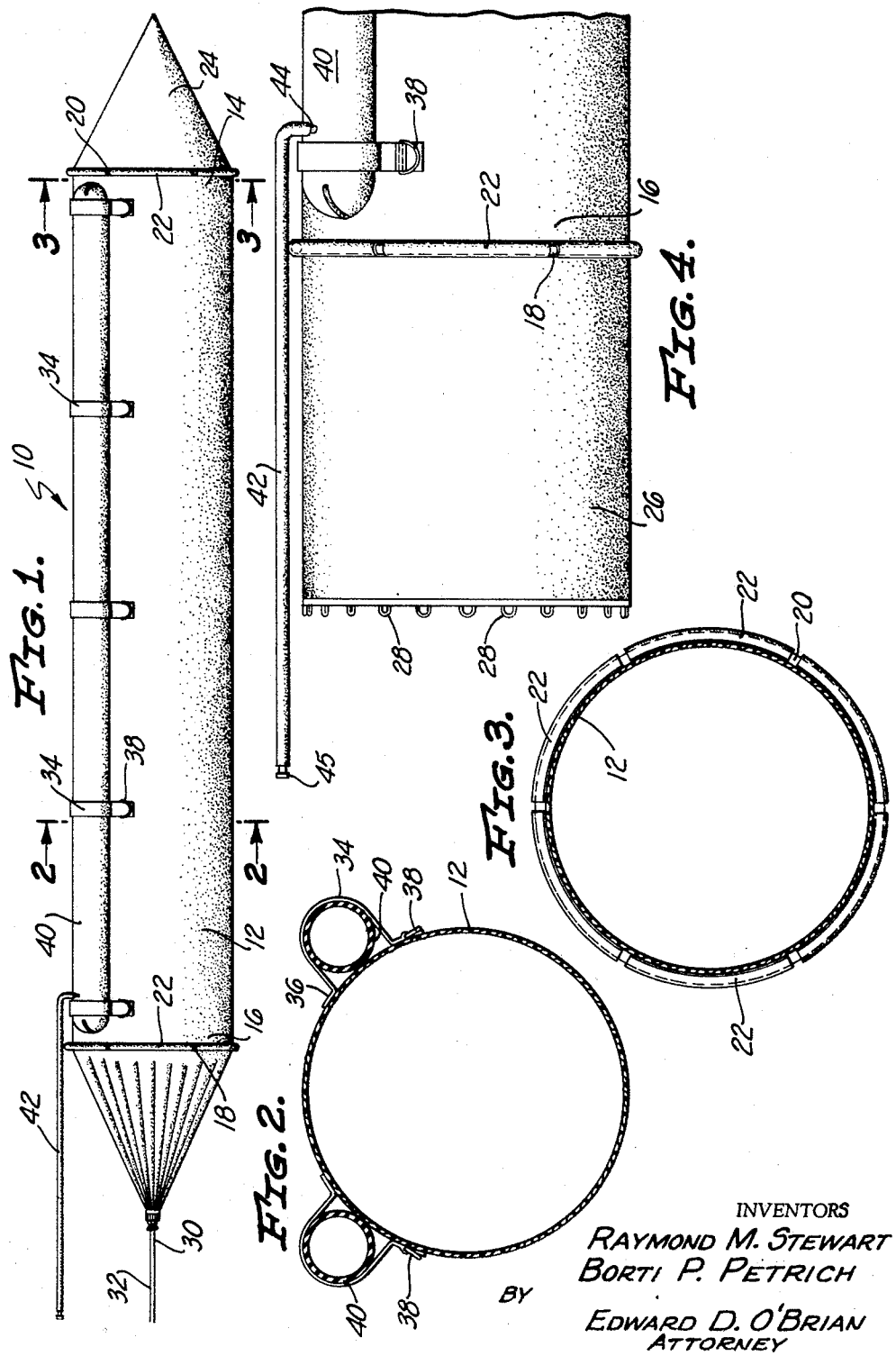

The present invention relates to a barge construction and more particularly is directed to a collapsible barge construction adapted to be utilized for the storage and transportation of large quantities of fish over extensive distances through the water.

It is the present practice in the fishing industry for fishing enterprises to send relatively large fleets of boats into a fishing area to obtain the necessary catch of fish. The quantity of fish caught is usually limited to the storage capacity of such boats. Thus, many times fully loaded fishing boats are forced to return to the processing or packing plants to deliver their catch while a particular run of fish is still at its peak. Also the operators of smaller boats suffer the disadvantage of only being able to make a limited number of trips to fishing grounds during a run of a particular kind of fish. At the present time an economic advantage lies with the operation of boats having large catch storage capacity even though the fishing efficiency of both large and small fishing boats is practically the same. Accordingly, the advantage of the availability of means to inexpensively and simply increase the storage capacity of both small and large fishing boats would be obvious to one skilled in the art.

Accordingly, it is an object of the present invention to provide means whereby the catch storage and hauling capacity of fishing boats can be increased.

It is another object of the present invention to provide collapsible catch storage and hauling means adapted to be conveniently stored on a fishing boat when not in use and towed in the water by a fishing boat when utilized to increase the catch storage and hauling capacity of a fishing boat.

A further object of this present invention is the provision of a barge structure adapted to store freshly caught fish submerged beneath the water surface and to be towed to port by a fishing boat with a catch of fish stored therein.

Another object of the present invention is the provision of a collapsible barge structure including inflatable flotation means adapted to suspend a water pervious fish storage compartment beneath the water surface and wherein means are provided whereby the barge can be towed by a fishing boat with a catch of fish therein.

It is another object of this invention to provide a fish barge inexpensive of manufacture, efficient in operation, easily installed and removed from operating assembly, and simply maintained in operating condition.

The manner in which the advantages of the present invention are more particularly realized and its further objects and features achieved will become more clearly apparent from the subsequent detailed description of the invention taken in reference to the drawing in which:

FIG. 1 is an elevation view of an assembled fish storage and towing barge constructed in accordance with the present invention;

FIG. 2 is a cross-sectional view taken along line 2—2 in FIG. 1;

FIG. 3 is a cross-sectional view taken along line 3—3 in FIG. 1; and

FIG. 4 is an enlarged fragmentary view of a portion of the fish barge shown in FIG. 4 with parts thereof disposed in different operational positions.

The accompanying drawing is primarily intended so as to illustrate a presently preferred means of constructing a collapsible fish storage and hauling barge falling within the scope of this disclosure. It is to be understood that those skilled in the art to which this invention pertains may effect alterations in the embodiment of the collapsible fish barge device disclosed by use of ordinary engineering skills without departure from the inventive concepts of the device. Also, further equivalent means can be employed in order to accomplish the operations and structural advantages of the invention.

As an aid toward understanding this invention it can be stated in essentially summary form that it involves a fish barge which comprises an elongated tubular body formed from flexible water pervious material. Girding metal support rings are secured adjacent the ends of the tubular body to conform the body to an expanded tubular configuration when suspended in water. This barge is further defined by a trailing end of cylindrical conical shape, a forward open tubular filling end provided with a closure draw string arrangement which also serves as a towing line, and elongated flexible flotation tanks secured to each side of the tubular body in parallel relation with respect to the longitudinal axis of the tubular member whereby a barge filled with a catch of fish will be disposed in the water with the compartment formed by the tubular body submerged beneath the flotation tanks which of course will be partially immersed in the water.

This invention can be more fully understood by referring to the accompanying drawing wherein FIG. 1 shows a fish storage and hauling barge 10 which comprises an elongated tubular body member 12 constructed from coated or treated light-weight porous materials such as canvas or similarly woven synthetic materials. Each of the ends 14 and 16 of this tubular body are provided with rigid girding rings 18 and 20 which serve to conform the tubular member to a fully expanded condition when the barge 10 is placed in water. These girding rings 18 and 20 are secured to the tubular member by means of a plurality of loops 22 each of which is sewn or otherwise secured to the material forming the tubular member 12. The trailing end 14 of the tubular member is closed off by means of a hollow cylindrical conical end member 24 which is formed of the same material as the tubular member and may be integrally formed therewith. This conical end member 24 serves the purpose of facilitating movement of the barge as it is towed through the water by a fishing boat.

At its front end 16, the tubular member 12 is provided with a tubular forwardly extending end member 26 which, again, may be formed integrally with and of the same material as the tubular member. This end member extends forwardly from the girding ring 18 and is provided at its free end with a plurality of attached D-rings 28. These D-rings receive a laced line 30 which may be continuous with an end thereof forming a tow line 32 of sufficient length to attach the barge to a fishing boat to position the barge 10 an adequate towing distance from the barge. When this line 30 is loosely disposed through the D-rings 28 the end member 26 may be disposed in the open position shown in FIG. 4 to permit loading of the barge with a catch of live fish and upon the drawing tight of the line 30 the end member 26 will assume the conical shape shown in FIG. 1 when the end 16 of the barge is closed off and the catch of fish confined within the compartment formed by the tubular member 12.

Along each of the sides of the tubular body member 12 means comprising securing belts 34 secured at a fixed end 36 to the body member and detachably secured by conventional lacing through D-rings 38 at their other end. These belts are utilized to secure flexible floatation tanks 40 to the tubular member 12. As shown in the preferred embodiment of the invention depicted in the accompanying drawing these tanks 40 each comprise flexible elongated tanks and are provided with an air supply hose 42 which is connected by an inlet valve 44 of conventional construction to the interior of the tanks and is provided at its free end with an entrance valve 45. These tanks 40 when inflated and secured to the tubular body of the barge 10 by the belts 34 cooperate with the rigid end rings 18 and 20 to maintain the tubular body extended and expanded to form an interior fish storage compartment when the barge is positioned in the water.

In utilizing the above described fish barge 10 it is intended that the floatation tanks 40 are deflated when the barge is stored aboard a fishing boat or elsewhere. This permits the barge to be compactly folded about the rigid rings 18 and 20 to thereby conserve storage space and to facilitate handling of the barge. When it is desired to use the barge for the storage and hauling of fish the barge may be unfolded and the floatation tanks 40 inflated while the barge is in the water so as to assume the condition shown in FIG. 1. As fish become available from the fishing nets they are put into the interior of the tubular body 12. This can be accomplished by the use of a fish bailer or fish pump. Upon completion of the filling operation the draw line 30 is pulled tight to close-off the front end 26 and the free end 32 of the draw line is secured to a suitable attaching point on a fishing boat. It is to be understood that several of these barges 10 can be utilized in the above described manner. Thus, the fish storage capacity of a small boat can be easily increased considerably beyond the normal inboard storage capacity of the boat.

From the foregoing it is apparent that a new fish storage and hauling barge has been provided and when used in the above described manner serves to materially increase the fish catch storage capacity of a fishing boat. Accordingly, the use of a plurality of such barges serves to increase quantity of fish that can be handled by a boat on each fishing trip. This is of particular value when small fish boats are involved because of the smaller initial investment involved. Also such increase in the fish storage and hauling capacity permits a boat of any size to extract a much larger quantity of fish from a particular run of fish and further eliminates frequent trips back to the processing plants or market. The use of such barges is regarded as being particularly applicable to fishing expositions for small fish such as the anchovy or sardine. However, these barges can be utilized with equal effectiveness in conjunction with the catching of larger fish.

It will be realized by those skilled in the art to which the invention pertains that by ordinary skills a variety of differently appearing fish storage and hauling barges may be designed and built utilizing the features of the invention as embodied in the above described example of the device of the invention. Accordingly, since the structures of the invention are susceptible to such modification the invention is to be considered as being limited only by the appended claim.

We claim:

A fish storage and hauling barge which comprises:

a hollow tubular body of substantially uniform cross section having a closed rear end and closable front end secured thereto, said body and said ends being formed of flexible water pervious material;

closure means for closing said front end of said hollow tubular body, said closure means comprising a plurality of rings secured in spaced relationship to the end of said front end away from said body, a draw line secured through said rings, said draw line being adapted for towing said fish storage and hauling barge and being arranged so that when said draw line is used to tow said barge, said rings are drawn together to close the front end of said barge;

flotation means secured externally of said hollow tubular body, said flotation means comprising two cylindrical flexible inflatable air tanks disposed along the length of said tubular body between said ends thereof, a plurality of securing belts extending around each of said air tanks and secured to said body to maintain said air tanks adjacent said body, air filling means secured to each of said air tanks to permit the inflation and deflation thereof;

girding rings formed from a rigid material disposed adjacent said rear and said front ends of said body to maintain said body expanded in tubular configuration when said body is immersed in water, said girding rings being secured to said body, said girding rings being positioned away from said closure means so that said front end may be opened and closed without interference by said girding rings, whereby said barge may be easily transported in or out of the water, and may be easily filled or emptied of fish.

References Cited in the file of this patent

UNITED STATES PATENTS

| | | |
|---|---|---|
| 2,253,688 | Collins | Aug. 26, 1941 |
| 2,969,036 | Brown | Jan. 24, 1961 |

FOREIGN PATENTS

| | | |
|---|---|---|
| 730,652 | Great Britain | May 25, 1955 |
| 846,359 | Great Britain | Aug. 31, 1960 |
| 173,496 | Sweden | Nov. 29, 1960 |